United States Patent

Yonezawa

Patent Number: 5,361,884
Date of Patent: Nov. 8, 1994

[54] CONVEYING ROLLER

[75] Inventor: Keitaro Yonezawa, Kobe, Japan

[73] Assignee: Kabushiki Kaisha Kosmek, Kobe, Japan

[21] Appl. No.: 136,280

[22] Filed: Oct. 15, 1993

[30] Foreign Application Priority Data

Oct. 16, 1992 [JP] Japan .................. 4-304604

[51] Int. Cl.⁵ ............................. B65G 13/00
[52] U.S. Cl. ........................ 193/35 R; 193/37
[58] Field of Search ............ 193/35 R, 37; 384/584

[56] References Cited

U.S. PATENT DOCUMENTS

| | | | |
|---|---|---|---|
| 2,730,222 | 1/1956 | Klein | 193/37 |
| 4,449,907 | 5/1984 | Yonezawa et al. | |
| 4,597,709 | 7/1986 | Yonezawa . | |
| 5,063,648 | 11/1991 | Yonezawa et al. | |
| 5,072,819 | 12/1991 | Yonezawa et al. | |

FOREIGN PATENT DOCUMENTS 59-140821 9/1984 Japan .

Primary Examiner—Joseph E. Valenza
Attorney, Agent, or Firm—Bacon & Thomas

[57] ABSTRACT

In a lower portion of a movable plate (1) of an injection moulding machine, there are provided a plurality of conveying rollers (10) arranged with a predetermined interval in the horizontal direction. The roller (10) comprises a support block (11) facing the movable plate (1), a support cylinder (12) fitted into an upper portion of the block (11), a roller member (14) externally mounted to the support cylinder (12), a bolt (16) inserted into a bore (15) of the support cylinder (12) through an annular clearance (17) and a positioning pin (18) fitted into a lower portion of the block (11) and the movable plate (1). The bolt (16) is screwed into the threaded hole (29) of the movable plate (1), so that the bolt (16) presses the support cylinder (12) onto the movable plate (1).

4 Claims, 5 Drawing Sheets

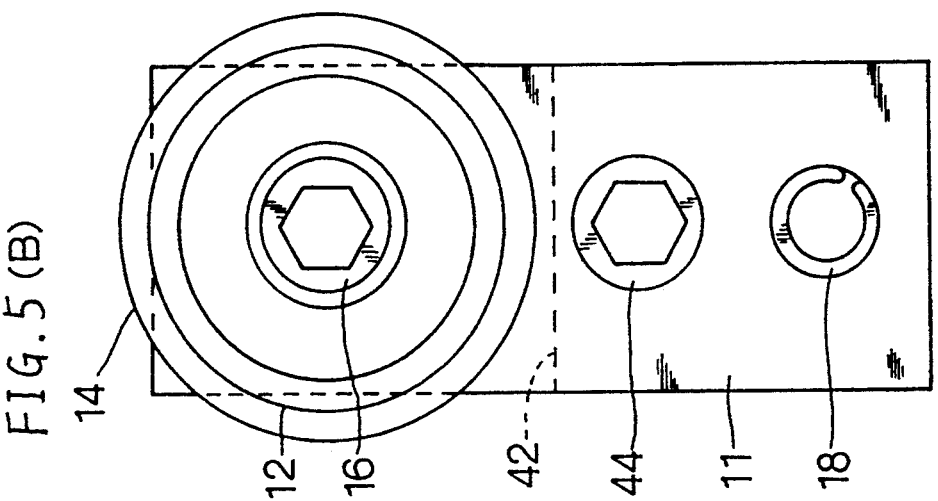
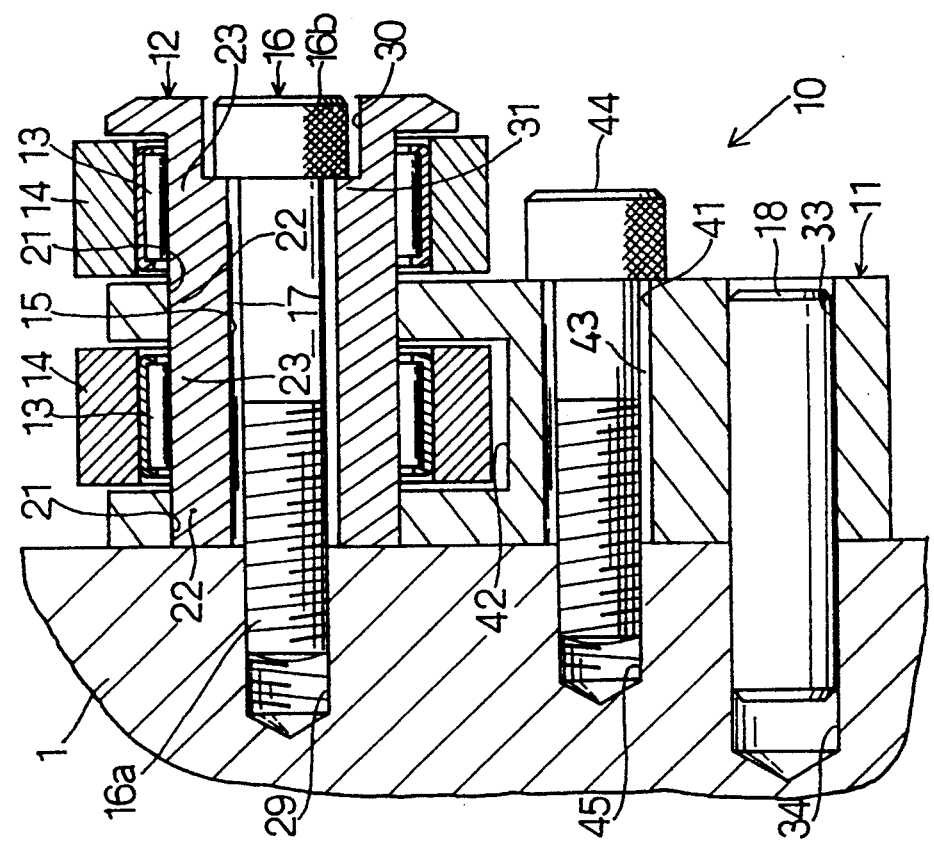
FIG. 5(B)
FIG. 5(A)

CONVEYING ROLLER

BACKGROUND OF THE INVENTION

1. Field of the Invention

The present invention relates to a roller adapted to convey a metal mould of an injection moulding machine and the like in the horizontal direction.

2. Description of the Prior Art

Among such conveying rollers, conventionally there are ones disclosed in Japanese Utility Model Publication No. 59-140821. The following two conventional embodiments are described in the publication.

As shown in FIG. 6, a conveying roller 60 of a first conventional embodiment is constructed as follows.

A threaded hole 79 and a circular bore 80 are formed coaxially in series in a fixed plate 51 of an injection moulding machine. A support cylinder 62 is constructed by a supporting portion 72 adapted to be fitted into tile circular bore 80 and a bearing portion 73 adapted to rotatably support a roller member 64 through a bearing 63. An axis of the supporting portion 72 is offset relative to an axis of the bearing portion 73. A bolt 66 is fitted into a cylindrical bore 65 of the support cylinder 62 coaxially to the supporting portion 72 and a leg portion 66a of the bolt 66 is threadably engaged with the threaded hole 79.

When a level of the roller member 64 is adjusted, the bolt 66 is loosened a little and the support cylinder 62 is rotated by a desired angle relative to the bolt 66 under that condition so as to change a height position of a top portion of the roller member 64. After that, the bolt 66 is tightened so as to press and secure the support cylinder 62 to a fixed plate 51 by its head portion 66b.

As shown in FIG. 7, in a conveying roller 60 of a second conventional embodiment, the supporting portion 72 of the first conventional embodiment is omitted from the support cylinder 62 and a midway portion of the bolt 66 is fitted into the circular bore 80. Other construction and the level adjusting method are the same as those in the first conventional embodiment.

In the respective conventional embodiments, when the conveying roller is mounted to the installed infection moulding machine, it is necessary to form the threaded hole 79 and the circular bore 80 in the fixed plate 51 on the working spot by means of a hand drill and so on.

Accordingly, there are the following problems associated with the first conventional embodiment ( refer to FIG. 6 ).

In order that the circular bore 80 rotatably supports the supporting portion 72 of is the support cylinder 62, it is necessary to finish the peripheral surface of the bore 80 with a high accuracy and to form the bore 80 coaxially to the threaded hole 79. Therefore, it is very difficult to carry out the machining in the working spot. As a result, it is troublesome to mount the conveying roller 60.

If the bolt 66 happens to be loosened even a little during conveying of a metal mould 55, the support cylinder 62 is subjected to a shock caused by the metal mould 55 to swing eccentrically about the bolt 66. Thereupon, the height position of the roller member 64 gets out of order. Therefore, it is apprehended that the metal mould 55 can't be conveyed smoothly.

In the second conventional embodiment ( refer to FIG. 7), since the bolt 66 is fitted into the circular bore 80, it is not necessary to hold a high finish accuracy for the peripheral surface of the circular bore 80 in comparison with the first conventional embodiment. But, since it is necessary to form the circular bore 80 coaxially to the threaded hole 79, it is still difficult to carry out the machining in the working spot.

Also in this second conventional embodiment, similarly to the first conventional embodiment, the height position of the roller member 64 gets out of order due to a swing of the support cylinder 62.

SUMMARY OF THE INVENTION

It is an object of the present invention to facilitate a mounting of a conveying roller and to enable a height position of the roller member to be held within an allowable range.

For accomplishing the above-mentioned object, for example as shown in FIGS. 1 through 3, a conveying roller is constructed as follows.

A support bore 21 is formed substantially horizon tally in an upper portion of a support block 11 facing a vertical wall 1. A supporting portion 22 of a support cylinder 12 is fitted into the support bore 21. A roller member 14 is supported by a bearing portion 23 of the support cylinder 12. A bolt 16 is inserted into a bore 15 of the support cylinder 12 so that a predetermined annular clearance 17 is provided therebetween. The bolt 16 is screwed into the threaded hole 29 of the vertical wall 1, so that the support cylinder 12 is pressed to the vertical wall 1. A positioning hole 33 is formed substantially horizontally in a lower portion of the support block 11. A receiving hole 34 is formed in the vertical wall 1 so as to face the positioning hole 33. A positioning pin is fitted into both these holes 33, 34.

The present invention functions, for example as shown in FIG. 1.

When mounting a conveying roller 10 to the vertical wall 1, the support block 11, the support cylinder 12 and the roller member 14 are previously assembled integrally.

Firstly, at a height position where a top portion of the roller member 14 takes a predetermined level, the threaded hole 29 is formed in the vertical wall 1. Then, the bolt 16 is inserted into the bore 15 of the support cylinder 12 and the bolt 16 is screwed lightly into the threaded hole 29 so as to temporarily fix the conveying roller 10 to the vertical wall 1.

A level of the top portion of the roller member 14 is adjusted accurately by shifting tile support block 11 vertically relative to the bolt 16 under that temporary fixing condition. After that, a drilling tool such as a drill and the like is put through the positioning hole 33 of the support block 11 so as to form the receiving hole 34 the vertical wall 1 by tile drilling tool. Subsequently, the positioning pin 18 is fitted into both these holes 33, 34. After that, the bolt 16 is -threadably secured strongly to the vertical wall 1.

Since the present invention is constructed and functions as mentioned above, the following advantages can be obtained.

It is enough to drill the receiving hole to be formed in tile vertical wall, at a position different from that of the threaded hole for the bolt and it is not necessary to arrange it coaxially to the threaded hole like the aforementioned conventional embodiments. Further, it is enough to make the finish accuracy of the peripheral surface of the receiving hole to such a degree as to enable the positioning pin to enter the hole and it is not necessary to finish the surface with a high accuracy. Accordingly, the drilling of the receiving hole becomes easy and the conveying roller can be mounted to the vertical wall readily.

Even if the bolt is loosened a little by any reason during conveying of the metal mould, since a weight of the metal mould is received by the positioning pin, slipping-downs of the support block and the support cylinder can be prevented and the height position of the roller member can be held within an allowable range.

BRIEF DESCRIPTION OF THE DRAWINGS

The above and other objects, advantages and features of the invention will become apparent when considered with the following detailed description and accompanying drawings wherein:

FIG. 1 (B) is a sectional view taken along the directed line B—B in FIG. 1 (A);

FIG. 2 is a front view of a movable plate for an injection moulding machine provided with the conveying roller;

FIG. 3 is a view taken along the directed line III—III in FIG. 2;

FIG. 5 (A) shows a second embodiment of the conveying roller of the present invention and is a view corresponding to FIG. 1 (A);

FIG. 5(B) shows the same conveying roller and is a view corresponding to FIG. 1(B);

DESCRIPTION OF THE PREFERRED EMBODIMENTS

First Embodiment

Figure 1:
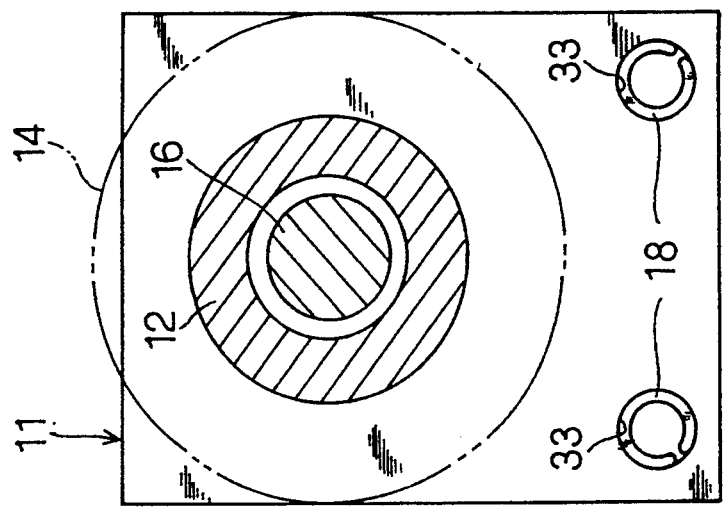
FIGS. 1 through 3 show a first embodiment of the present invention.
Figure 1A:
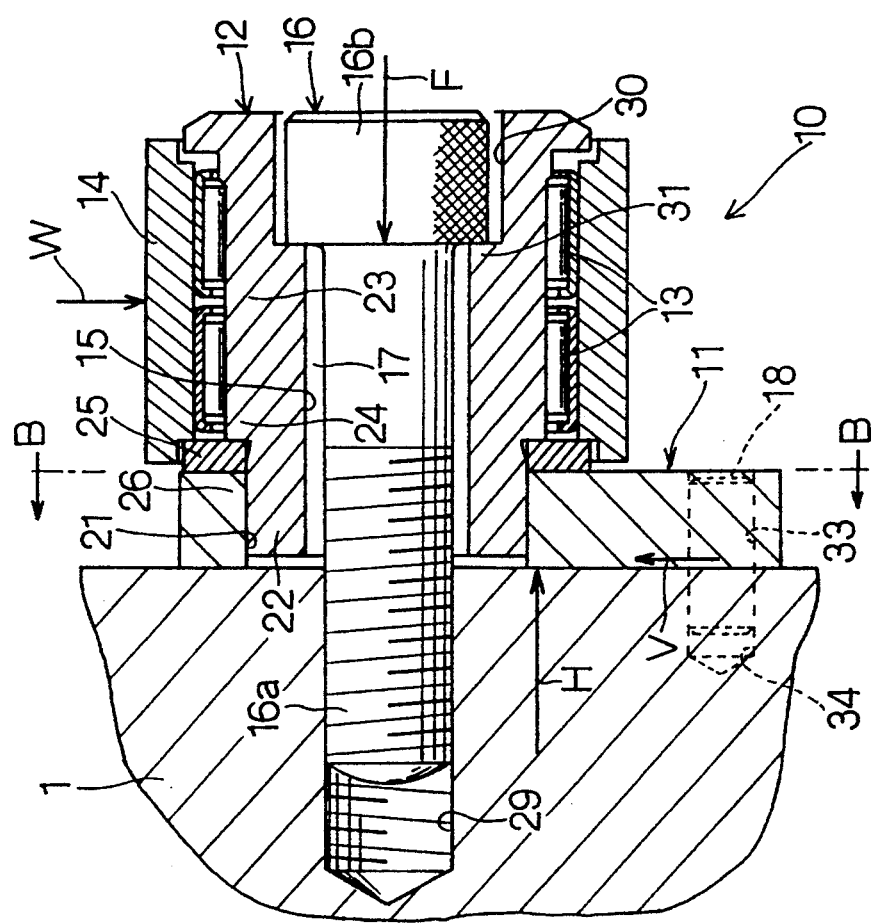
FIG. 1(A) is a vertical sectional view of a conveying roller.
Figure 2:
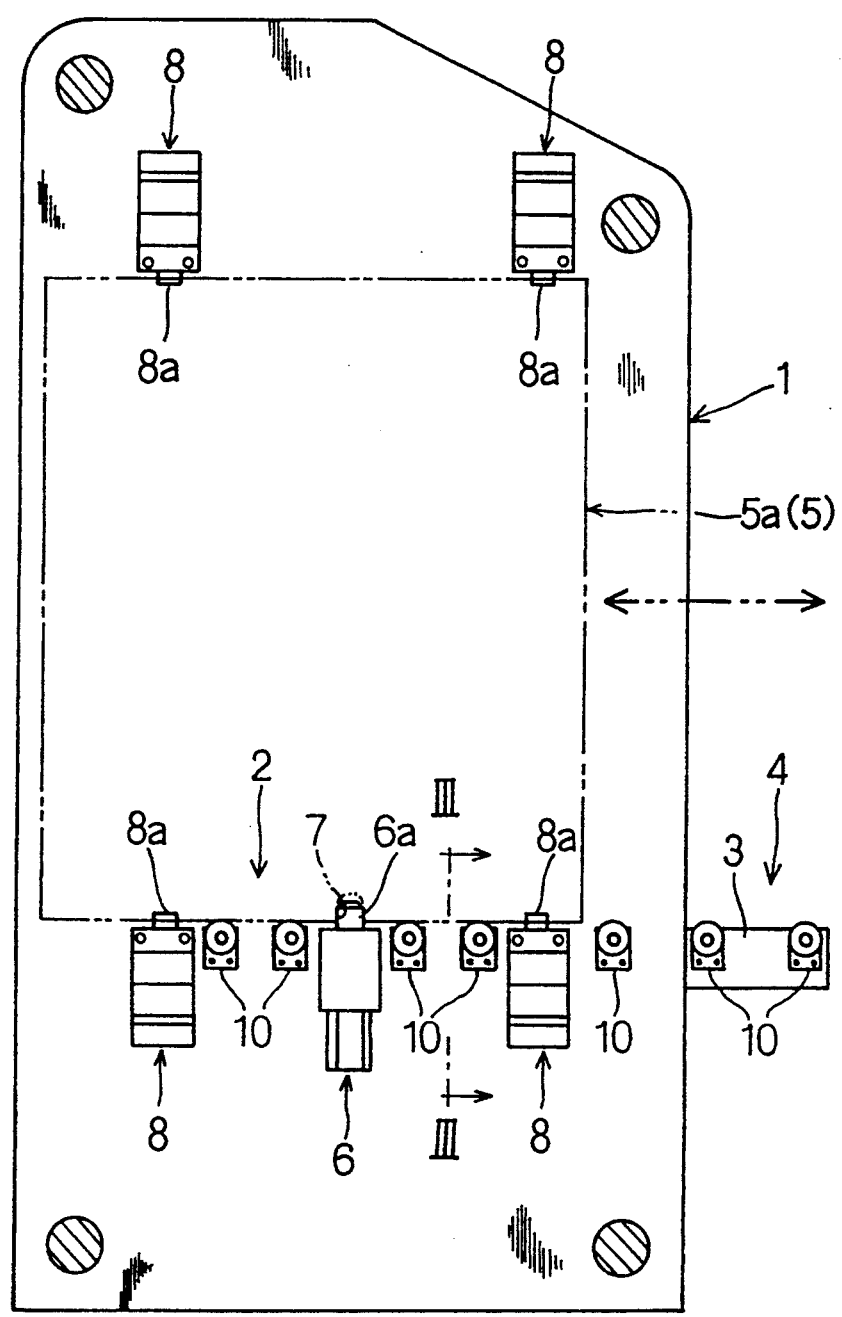
Figure 3:
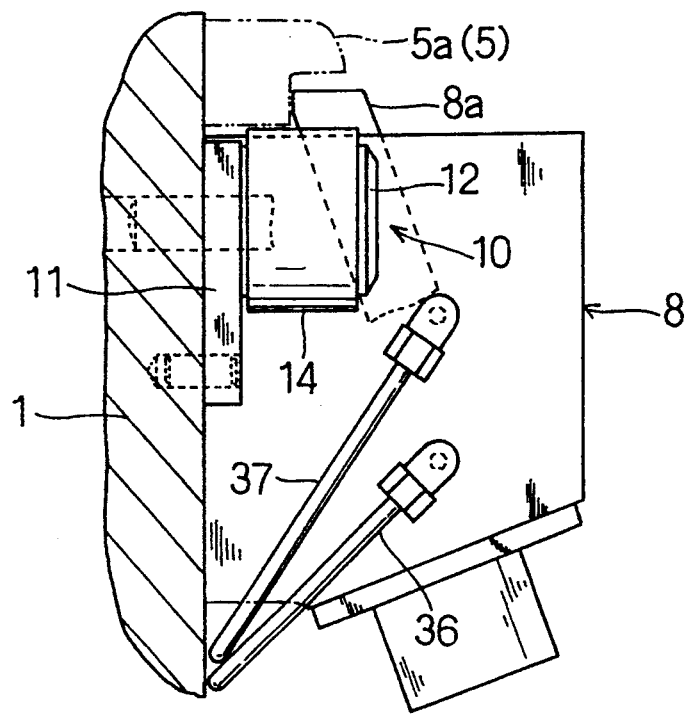

FIGS. 1 through 3 show a first embodiment of the present invention. Firstly, a general construction thereof will be explained with reference to FIGS. 2 and 3.

The symbol 1 designates a movable plate of a horizontal injection moulding machine. A first roller conveyer 2 is mounted to each lower portion of the movable plate 1 and a fixed plate ( not illustrated ). A second roller conveyer 4 is mounted to brackets 3 projecting rightwards from these movable plate 1 and fixed plate respectively.

After a metal mould 5 is moved to a space on the right side of the injection moulding machine, it is conveyed to a location between the movable plate 1 and the fixed plate through the second roller conveyer 4 and the first roller conveyer 2 in order. The conveyed metal mould 5 is positioned by fitting a rod 6a of a positioning cylinder 6 into a groove 7 of a movable mould part 5a. After that, the movable mould part 5a is pressed and secured to the movable plate 1 by means of clamping members 8a of four fluid pressure clamps 8 and also a fixed mould part (not illustrated) is pressed and fixed to the fixed plate.

The first roller conveyer 2 comprises five conveying rollers 10 arranged with a predetermined interval in the horizontal direction along the movable plate 1 as a vertical wall. Also the second roller conveyer 4 comprises the two similar conveying rollers 10 with a predetermined interval in the horizontal direction along the bracket 3 as the vertical wall.

Incidentally, also the fixed plate is provided with the two roller conveyers similarly to the above.

As shown in FIG. 1, the conveying roller 10 is provided with a support block 11 facing the movable plate 1, a support cylinder 12, two bearings 13 and a roller member 14 arranged coaxially to one another and in order from inside in the radial direction, a bolt 16 inserted into a bore 15 of the support cylinder 12 through a predetermined annular clearance 17 and two positioning pins 18 inserted into an lower portion of the support block 11. The pin 18 comprises a spring pin.

When explaining in detail, a support bore 21 extending substantially horizontally is formed in an upper portion of the support block 11. A supporting portion 22 of the support cylinder 12 is fitted into the support bore 21 and the roller member 14 is rotatably fitted externally onto a bearing portion 23 of the support cylinder 12 through the bearings 13, 13. The bearing portion 23 is so formed as to have a larger diameter than that of -the supporting portion 22 and a shoulder portion 24 between both those portions 23, 22 is adapted to be received by a peripheral wall 26 of the support bore 21 through a cylindrical spacer 25.

A threaded leg portion 16a of the bolt 16 is screwed into a threaded hole 29 of the movable plate 1 so that a head portion 16b of the bolt 16 presses the support cylinder 12 toward the movable plate 1. Incidentally, the bolt head portion 16b received in a concaved portion 30 of the support cylinder 12 so as to press a bottom wall 31 of the concaved portion 30. Two positioning holes 33 are formed in a lower portion of the support block 11 so as to pass through the portion.

The conveying roller 10 having the above-mentioned construction is mounted to the movable plate 1 with the following procedure.

The support block 11, the support cylinder 12, the bearings 13, the roller member 14 and the spacer 25 are previously assembled integrally.

Firstly, the threaded hole 29 is formed by a tapping in the movable plate 1 at such a height position that the top portion of the roller member 14 takes a predetermined level. Then, the bolt 16 is inserted into the bore 15 of the support cylinder 12 and is screwed into the threaded hole 29 lightly so as to fix the conveying roller 10 to the movable plate 1 temporarily.

Under the temporary fixing condition, the support block 11 is shifted vertically a little relative to the bolt 16 so as to adjust the level of the top portion of the to roller member 14 accurately. Such level adjustment is applied to all of the plurality of conveying rollers 10. After that, a drill is put through each positioning hole 33 of each support block 11, so that two receiving holes 34 are formed in the movable plate 1 by the drill. Subsequently, the pin 18 is fitted into both those holes 33, 34. After that, the bolt 16 is strongly threadably secured to the movable plate 1.

As schematically shown in FIG. 1 ( A), a metal mould weight W acting onto the roller member 14 during conveying of the metal mould 5 is received by a vertical resistive force V of the pin 18. Though a horizontal reaction force H acts from the movable plate 1 to the support block 11 so as to cope with a moment produced by the metal mould weight W, the horizontal reaction force H is received by a tightening force F of the bolt 16. Therefore, a bending moment hardly has an effect on the bolt 16.

According to the above-mentioned embodiment, the following advantages can be obtained.

Since the support cylinder 12 is provided with the shoulder portion 24 formed by making a diameter of the bearing portion 23 larger than that of the supporting portion 22 and the shoulder portion 24 is received by a peripheral wall 26 of the support bore 21 through the spacer 25, an arm length for the horizontal reaction force H becomes larger and a value of the horizontal reaction force H becomes smaller by an elongated portion of the arm length. As a result, a durability of the conveying roller 10 is improved.

Since the support cylinder 12, the roller member 14 and the bolt 16 are arranged substantially coaxially, even when the support cylinder 12 rotates a little slippingly at the time of tightening the bolt 16, the level of the top portion of roller member 14 hardly changes. As a result, the level adjustment o f the roller member 14 becomes easy.

Further, since the support block 11 doesn't project below the roller member 14, as shown in FIG. 3, a clamping supply or discharge hose 36 of the fluid pressure clamp 8 and an unclamping supply or discharge hose 37 don't interfere with the conveying roller 10. Therefore, as shown in FIG. 2, it becomes possible to reduce a space in the right and left directions between the fluid pressure clamp 8 and the conveying roller 1 0, so that the metal mould 5 can be conveyed smoothly.

Figure 4:
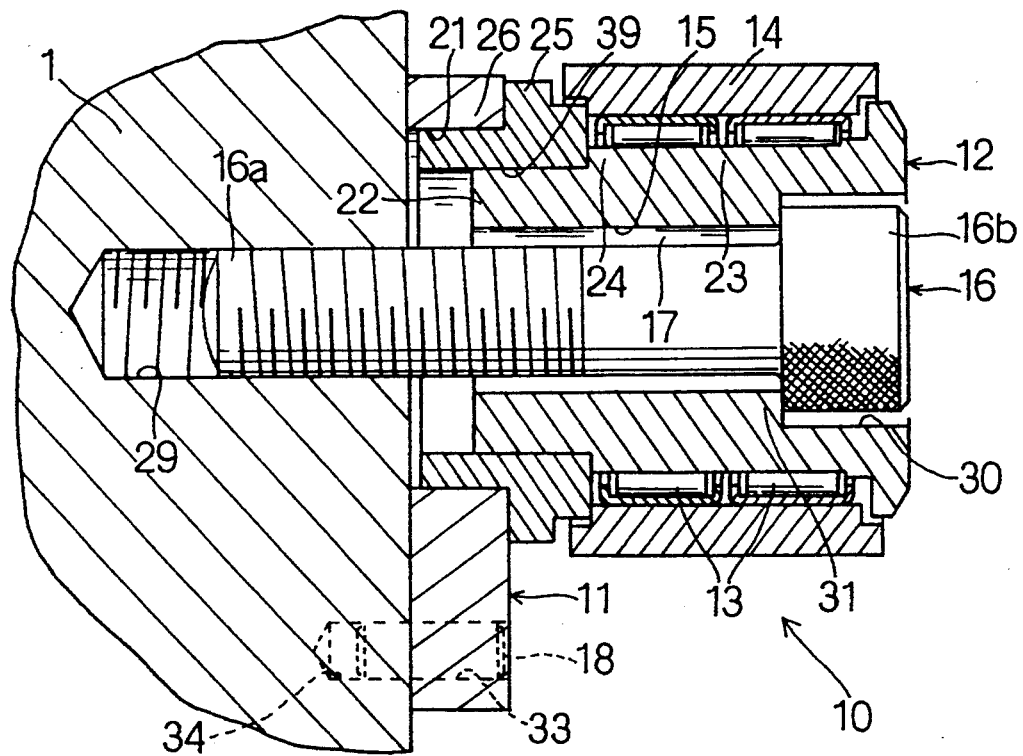
FIG. 4 shows a variant example of the conveying roller and is a view corresponding to FIG. 1 (A)
Figure 6:
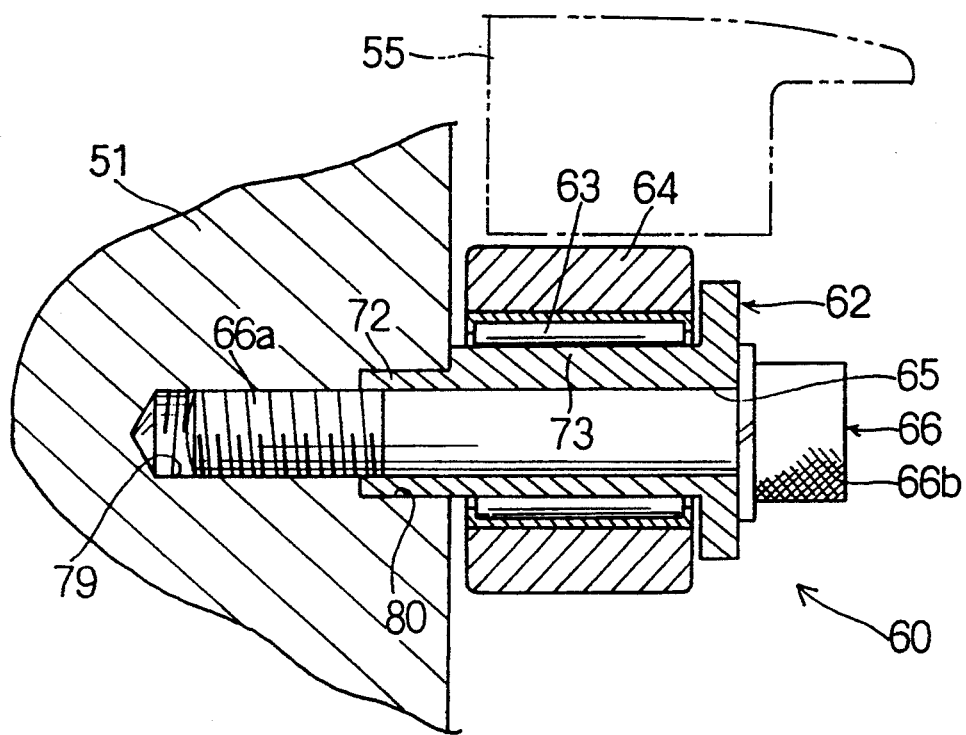
FIG. 6 shows a first conventional embodiment and is a view corresponding to FIG. 1 (A)
Figure 7:
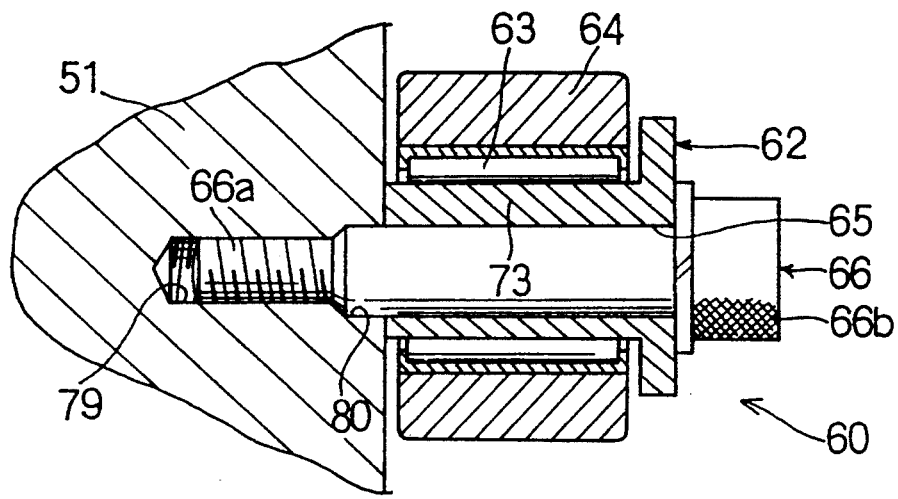
FIG. 7 shows a second conventional embodiment and is a view corresponding to FIG. 1 (A).

FIG. 4 shows a variant example of the first embodiment.

In this variant example, the spacer 25 is formed in a stepped cylindrical configuration. The supporting portion 22 of the support cylinder 12 is fitted into a cylindrical bore 39 of the spacer 25 and the spacer 25 is fitted into the support bore 21 of the support block 11.

The first embodiment and the variant example may be modified as follows.

Instead of two pieces of positioning pins 18, only one pin 18 may be employed. In this case, the positioning hole 33 may be located at one of the right and the left sides or at the middle.

Further, the pin 18 may comprise a usual solid pin instead of the spring pin.

Second Embodiment

FIG. 5 shows a second embodiment of the present invention. In this second embodiment, component members having the same constructions as those in the first embodiment are designated by the same symbols.

In the support block 11 which is elongate vertically, the support bores 21, 21 arranged in series horizontally, the bolt hole 41 and the positioning hole 33 are formed in order from above. The symbol 42 designates a roller accommodating groove. The support cylinder 12 inserted into both those support bores 21, 21 is pressed to the movable plate 1 by the bolt 16. Incidentally, similarly to the above, the annular clearance 17 is formed between the cylindrical bore 15 of the support cylinder 12 and the bolt 16.

The support cylinder 12 has two supporting portions 22, 22 and two bearing portions 23, 23 formed in the same diameter and has two sets of narrower bearings 13 and roller members 14 assembled thereon. Another annular clearance 43 is provided in the bolt hole 41 and another bolt 44 is inserted thereinto so as to be threadably secured to another threaded hole 45 of the movable plate 1.

The conveying roller 10 having the above-mentioned construction is mounted to the movable plate 1 with the following procedure.

Under such a condition that the support block 11 and the support cylinder 12 are temporarily fixed to the movable plate 1 by those tow bolts 16, 44, the levels of both those roller members 14, 14 are adjusted. After that, the positioning pin 18 is fitted into both the positioning hole 33 and the receiving hole 34 of the movable plate 1. Subsequently, both the bolts 16, 44 are tightened.

As many different embodiments of the present invention will be obvious to those skilled in the art, some of which have been disclosed or referred to herein, it is to be understood that tile specific embodiments of the invention as presented herein are intended to be by way of illustration only and are not limiting on the invention, and it is to be understood that such embodiments, changes, or modifications may be made without departing from the spirit and scope of the invention as set forth in the claims appended hereto.

What is claimed is:

1. A conveying roller comprising:
    a support block (11) having a support bore (21) and a positioning hole (33) formed in the upper and lower portions thereof respectively so as to extend in the substantially horizontal direction and facing a vertical wall (1) having a threaded hole (29) and a receiving hole (34) formed in the upper and lower portions thereof respectively so as to extend similarly in the substantially horizontal direction;
    a support cylinder (12) having a cylindrical bore (15) and provided with a supporting portion (22) to be fitted into the support bore (21) and a bearing portion (23) supporting a roller member (14);
    a bolt (16) to be inserted in to the cylindrical bore (15) through a predetermined annular clearance (17) and screwed into the threaded hole (29) so as to press the support cylinder (12) to the vertical wall (1) by the bolt (16); and
    a positioning pin (18) to be fitted into the positioning hole (33) and the receiving hole (34).

2. A conveying roller as set forth in claim 1, wherein a concaved portion (30) for accommodating a head (16b) of the bolt (16) is provided in the cylindrical bore (15) of the support cylinder (12).

3. A conveying roller as set forth in claim 1, wherein the bearing portion (23) so formed as to have a larger diameter than that of the support portion (22), and a shoulder portion (24) provided between both these portions (23) (22) and is adapted to be received by a peripheral wall (26) of the support bore (21).

4. A conveying roller as set forth in claim 3, wherein a cylindrical spacer (25) is interposed between the peripheral wall (26) of the support bore (21) and the shoulder (24).

* * * * *